July 14, 1931.  E. H. WINDLE  1,814,577
AUTOMATIC SPEED CONTROL
Filed Aug. 29, 1929
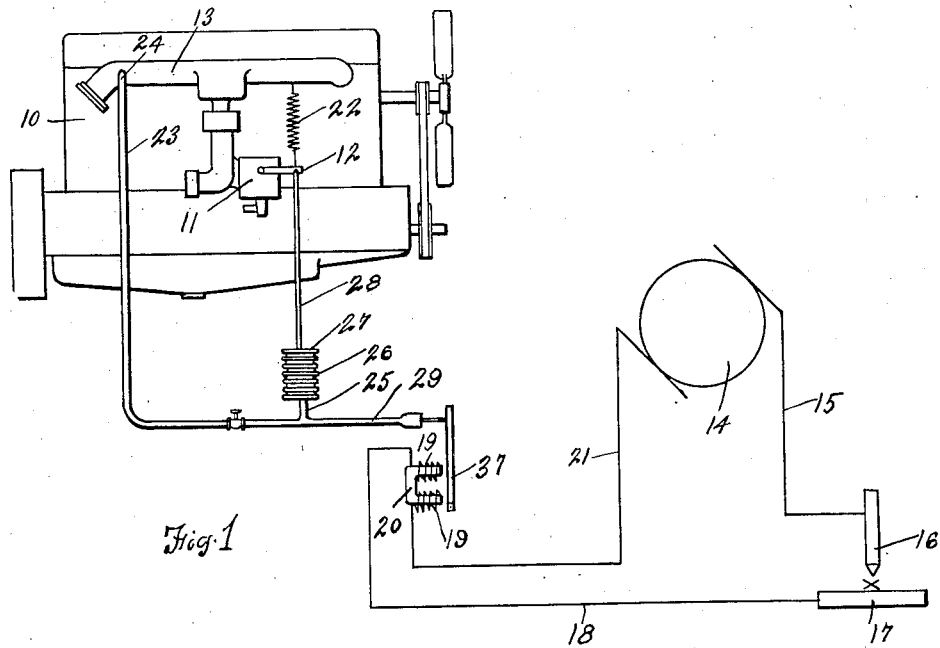
Fig. 1
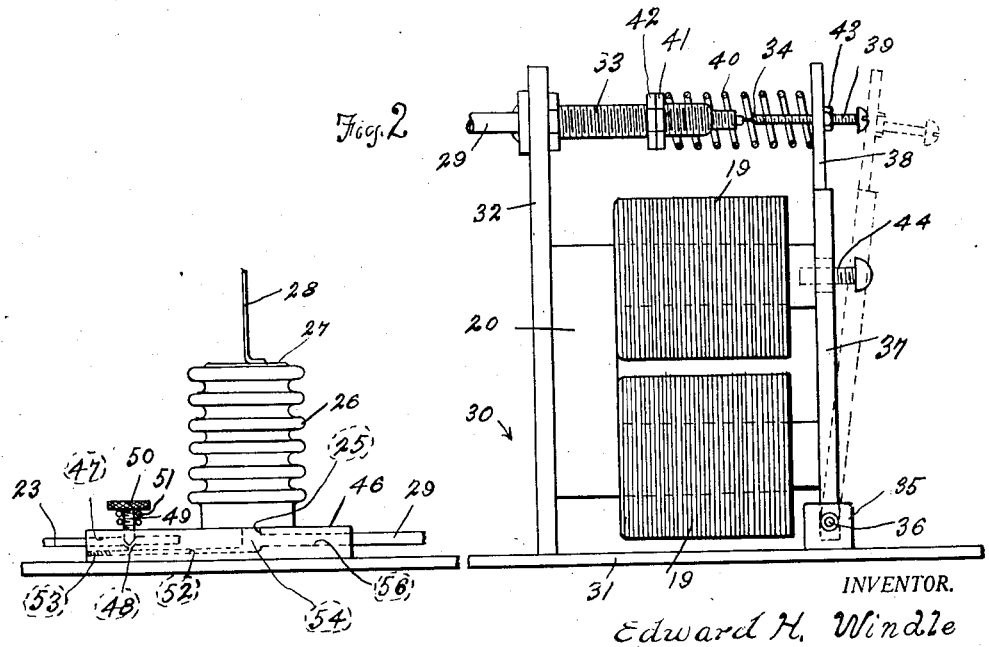
Fig. 2
Fig. 3
INVENTOR.
Edward H. Windle
BY
Fay, Oberlin & Fay
ATTORNEYS.

Patented July 14, 1931

1,814,577

UNITED STATES PATENT OFFICE

EDWARD H. WINDLE, OF CLEVELAND, OHIO, ASSIGNOR TO THE LINCOLN ELECTRIC COMPANY, OF CLEVELAND, OHIO, A CORPORATION OF OHIO

AUTOMATIC SPEED CONTROL

Application filed August 29, 1929. Serial No. 389,221.

The present invention relates, as indicated, to an automatic speed control, and more particularly to means for controlling the operating speed of the power means used to drive the generator in portable electric welding outfits.

The ordinary outfit of this character comprises a gasoline engine suitably connected to drive the generator, said generator being connected to supply an electric circuit including a carbon or other suitable element as one electrode and the work to be welded as the other electrode for arc-welding operations. It will be readily understood that it is desirable, in the use of an outfit of this character, to permit the engine to idle during such time as the operator is not actually welding with the outfit; but it will also be understood that the operator will not take the time to shut down his engine between welding operations unless there is going to be a relatively long interval during which he does not expect to be using his arc. It is an object of the present invention, then, to provide automatic means, operable by the current flow in the welding circuit, to cause the engine to run at normal welding speed at all times when the arc is actually in use, but to cut down to idling speed whenever the welding circuit is broken. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a diagrammatic illustration of the outfit as a whole; Fig. 2 is a side elevation of a detail of the mechanism; and Fig. 3 is a side elevation of a further detail of the mechanism.

Referring more particularly to the drawings, it will be seen that I have indicated a gasoline engine 10 provided with a carburetor 11, flow through which is adapted to be controlled by a throttle valve to which is connected an operating arm 12. The engine is also provided with the usual intake manifold 13. An electric generator 14 is connected by suitable means (not shown) to be driven by the engine 10, and said generator is adapted to supply current to a welding circuit including the lead 15 to an electrode 16, a piece of work or other electrode 17, a lead 18, coils 19 for an electro-magnet 20, and the lead 21. It will be seen that the magnet 20 is energized when, and only when, the electrodes 16 and 17 are brought close enough together to permit the formation of an arc whereby current will be caused to flow in the above detailed circuit. The coils 19, which it will be noted are the only coils in the welding circuit, also function as the stabilizing inductance for the welding circuit.

A coiled spring 22 is connected to the arm 12 and tends to hold the throttle valve in open position. A tube 23 is connected at 24 to the intake manifold 13, and said tube communicates, through a passage or branch 25, with the interior of a bellows 26. To the upper end 27 of said bellows there is connected a rod 28, the opposite end of which is connected to the arm 12. A branch 29 of the tube 23 extends beyond the passage 25.

Referring more particularly to Fig. 2, it will be seen that the magnet 20 is mounted in a frame indicated generally at 30 and comprising a base 31 and an upstanding wall 32, the magnet 20 being secured to said wall 32.

Above the magnet 20 and extending parallel thereto, there is mounted in the wall 32 a valve casing 33, which in the illustrated embodiment, is an ordinary tire valve. The casing 33, of course, houses the usual valve (not shown) which is provided with the usual stem 34 projecting outwardly beyond the limits of the casing 33. Upon the base 31 there is mounted a bracket 35 providing a bearing for a pivot 36 upon which is mounted an armature 37 adapted to cooperate with the magnet 20. Said armature 37 is provided with an extension 38 in which is adjustably mounted a screw 39. A coiled spring 40 is sleeved over the casing 33, bearing at its one end against a nut 41 threaded onto said casing 33 and backed up by a lock nut 42, and bearing at its opposite end against the projection 38 of the armature 37. A lock nut 43 is provided for holding the screw 39 in adjusted position. In one arm of the magnet 20 there is threaded a screw 44, said screw passing through a slot in the armature 37 and acting to limit the movement of the armature 37 under the influence of the spring 40.

Referring now to Fig. 3, it will be seen that the lower end of the bellows 26 is secured to a block 46 which, in turn, is fixedly mounted upon a base which may be a continuation of the base 31. The block 46 is provided with a passage 47 to which may be connected the tube 23. A restricted port 48 is controllable by a needle valve 49 threaded into said block 46 and provided with a knurled head 50 for facilitating adjustment thereof. A small coil spring 51 is sleeved on said needle valve 49 and is adapted to be compressed between said head 50 and block 46 to prevent accidental movement of said valve.

The port 48 provides communication between the passage 47 and a second parallel passage 52, the outer end of which is adapted to be closed by a plug 53 threaded thereinto. Said passage 52 opens into an enlarged chamber 54 from which extends the branch 25 opening into the interior of said bellows 26. A second branch 56 extends to the end of the block 46, and the tube 29 is adapted to be connected thereto.

With the outfit in static condition, the spring 22 will hold the arm 12 in a position to hold the throttle valve open. The spring always provided in casings of the type of the casing 33 will hold the valve in said casing in closed position. The spring 40 will hold the armature 37 in the dotted line position in Fig. 2. If, now, the engine 10 is started, the pressure in the intake manifold 13 will immediately drop to a value considerably below that of atmospheric pressure. The pressure of the atmosphere on the external surface of the bellows 26 will tend to collapse said bellows, forcing the air contained therein through the passages 25 and 52 to the port 48. The valve 49 being set in a desired partially open position, the air will squeeze slowly past said valve, through the passage 47 and through the tube 23 to the region of low pressure in the manifold 13. It will be obvious that the time required for complete collapse of the bellows 26 will depend upon the setting of the valve 49. As the bellows 26 slowly collapses, the arm 12 is slowly rotated in a clockwise direction as viewed in Fig. 1 until, when the bellows reaches its completely collapsed condition, the arm 12 will be in a position to correspond to idling position of the throttle valve. If, now, the electrode 16 is brought sufficiently close to the electrode 17 to cause an arc, the magnet 20 is energized, and the armature 37 is swung in a counter-clockwise direction as viewed in Fig. 2 to bring the screw 39 into engagement with the valve stem 34 to open the valve. Air immediately rushes through said casing 33 and the tube 29 and passage 56 to the interior of the bellows 26 to raise the pressure therein to such a value as to permit the spring 22 to move the arm 12 into valve-open position. In view of the fact that the passage 56 is considerably larger than the passage 52, it will be obvious that whenever the valve in the casing 33 is opened, the pressure in the bellows 26 will be built up sufficiently to permit the throttle valve to be opened.

As soon as the electrodes 16 and 17 are separated so that the welding circuit is broken, the spring 40 will move the armature 37 clockwise as viewed in Fig. 2 to permit the valve in the casing 33 to close, and the pressure will again be reduced in the chamber 26, whereby the speed of the engine is again reduced.

It will be obvious that the valve 49 can be so adjusted as to make the period between the time when the welding circuit is broken and the time when the engine reaches its idling speed of almost any desired duration. Customarily, this period will be between 10 and 30 seconds, thus permitting the operator to change his welding wire, make small adjustments in his work, or the like, without causing the engine to lose welding speed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In electric arc welding apparatus, the combination with a welding current generator, of driving means for such generator, and means responsive to characteristics of the welding circuit for varying the operating conditions of such driving means, said means adapted to become effective only at the expiration of a regulatable time interval after the occurrence of a change in said welding circuit characteristics.

2. In electric arc welding apparatus, the combination with a welding current generator, of driving means for such generator, and means responsive to the initiation and termination of the welding arc for varying the operating conditions of such driving means, said means adapted to become effective at the expiration of a regulatable time interval after the termination of such arc, and substantially instantaneously after the initiation of such arc.

3. In electric arc welding apparatus, the combination with a welding current generator, of means for driving said generator, inductance means for stabilizing the welding current, and means responsive to the magnetic characteristics of said inductance means for reducing the speed of said driving means at the expiration of a predetermined time interval after the arc is ruptured.

4. In electric arc welding apparatus, the combination with a welding current generator, of means for driving said generator, inductance means for stabilizing the welding current, and means responsive to the magnetic characteristics of said inductance means for varying the operating conditions of said driving means, said means adapted to become effective at the expiration of a regulatable time interval after a change in such magnetic characteristics of said inductance.

5. In electric arc welding apparatus, the combination of a welding current generator, driving means for such generator, and means for reducing the speed of such driving means at the expiration of a regulatable time interval after the welding arc is ruptured.

6. In electric arc welding apparatus, the combination of a welding current generator, driving means for such generator, and means for effecting changes in the speed of such driving means, said means adapted to become effective to reduce such speed only at the expiration of a relatively long time interval after the welding arc is ruptured, and to increase such speed, if lower than the welding speed, substantially instantaneously after the welding arc is struck.

7. In electric arc welding apparatus, the combination of a welding current generator, driving means for such generator, and means for effecting changes in the speed of such driving means, said means adapted to become effective to reduce such speed only at the expiration of a regulatable time interval after the welding arc is ruptured, and to increase such speed, if lower than the welding speed, substantially instantaneously after the welding arc is struck.

8. In electric arc welding apparatus, the combination of a welding current generator, driving means for such generator, and means for reducing the speed of such driving means at the expiration of a predetermined time interval after the welding arc is ruptured.

9. In electric arc welding apparatus, the combination of a welding current generator, driving means for such generator, and means for varying the operating characteristics of such driving means at the expiration of a predetermined time interval after the welding arc is ruptured.

Signed by me this 27th day of August, 1929.

EDWARD H. WINDLE.